United States Patent [19]

Kitamori

[11] Patent Number: 5,561,766
[45] Date of Patent: Oct. 1, 1996

[54] CROSS-CONNECTING SYSTEM FOR MAKING LINE CONNECTIONS BETWEEN HIGH-SPEED LINES AND LOW-SPEED LINES AND BETWEEN HIGH-SPEED LINES AND CAPABLE OF DETECTING A LINE-CONNECTION ERROR

[75] Inventor: Katsuya Kitamori, Kanagawa, Japan

[73] Assignee: Fujitsu Limited, Kanagawa, Japan

[21] Appl. No.: 300,735

[22] Filed: Sep. 2, 1994

[30] Foreign Application Priority Data

Mar. 15, 1994 [JP] Japan ..................... 6-044312

[51] Int. Cl.$^6$ .............................. G06F 11/00; H04L 1/20
[52] U.S. Cl. ..................... 395/183.19; 371/20.1
[58] Field of Search ............... 371/20.1, 15.1; 370/41; 379/2; 395/325, 183.19

[56] References Cited

U.S. PATENT DOCUMENTS

| | | | |
|---|---|---|---|
| 4,736,377 | 4/1988 | Bradley et al. | 371/37 |
| 4,931,924 | 6/1990 | Kageura | 364/200 |
| 5,058,104 | 10/1991 | Yonehara et al. | 370/14 |
| 5,058,110 | 10/1991 | Beach et al. | 370/85.6 |

FOREIGN PATENT DOCUMENTS

| | | |
|---|---|---|
| 3-214949 | 9/1991 | Japan . |
| 5-14299 | 1/1993 | Japan . |

OTHER PUBLICATIONS

Kessler, Inside TCP–IP, LAN Magazine, Jul. 1989, p. 134.
Smyth, Networks and Their Protocols, Electronics and Communications Engineering Journal, Feb. 1990, p. 27.
Dhar et al., Network Interconnection and Protocol Conversion—A Protocol Complementation Approach, IEEE Region 10 Conference, Nov. 1992.
Serre, et al., Implementing OSI–Based Interfaces for Network Management, IEEE Communications Magazine, May 1993, p. 76.
Udo W. Pooch et al., Telecommunications and Networking, CRC Press, 1991, at pp. 47–51.

*Primary Examiner*—Robert W. Beausoliel, Jr.
*Assistant Examiner*—Alan M. Fisch

[57] ABSTRACT

There is provided a cross-connecting system capable of automatically detecting a connection error and a position where the connection error has occurred. The cross-connecting system has a cross-connecting apparatus which makes connection between a high-speed line and a low-speed line or between two high-speed lines so as to transfer a main signal therethrough. A line-connection information adding unit is provided for adding line-connection information to an overhead of the main signal. A line-connection information detecting unit is provided for detecting the line-connection information. A determining unit provides the line-connection information to the line-connection information adding unit, and determines a presence of a connection error along a line through which the main signal is transferred in accordance with the line-connection information received from a remote cross-connecting system. The line-connection information comprises type information, apparatus identification information and line identification information. The type information being set as either one of request information and response information. The apparatus identification information represents an apparatus identification of the cross-connecting apparatus provided in the designated remote cross-connecting system or a cross-connecting system in which an erroneous connection has been made. The line identification information represents a line identification of the low-speed line connected to the designated remote cross-connecting system or a line identification of the high-speed line of a cross-connecting system in which an erroneous connection has been made.

11 Claims, 8 Drawing Sheets

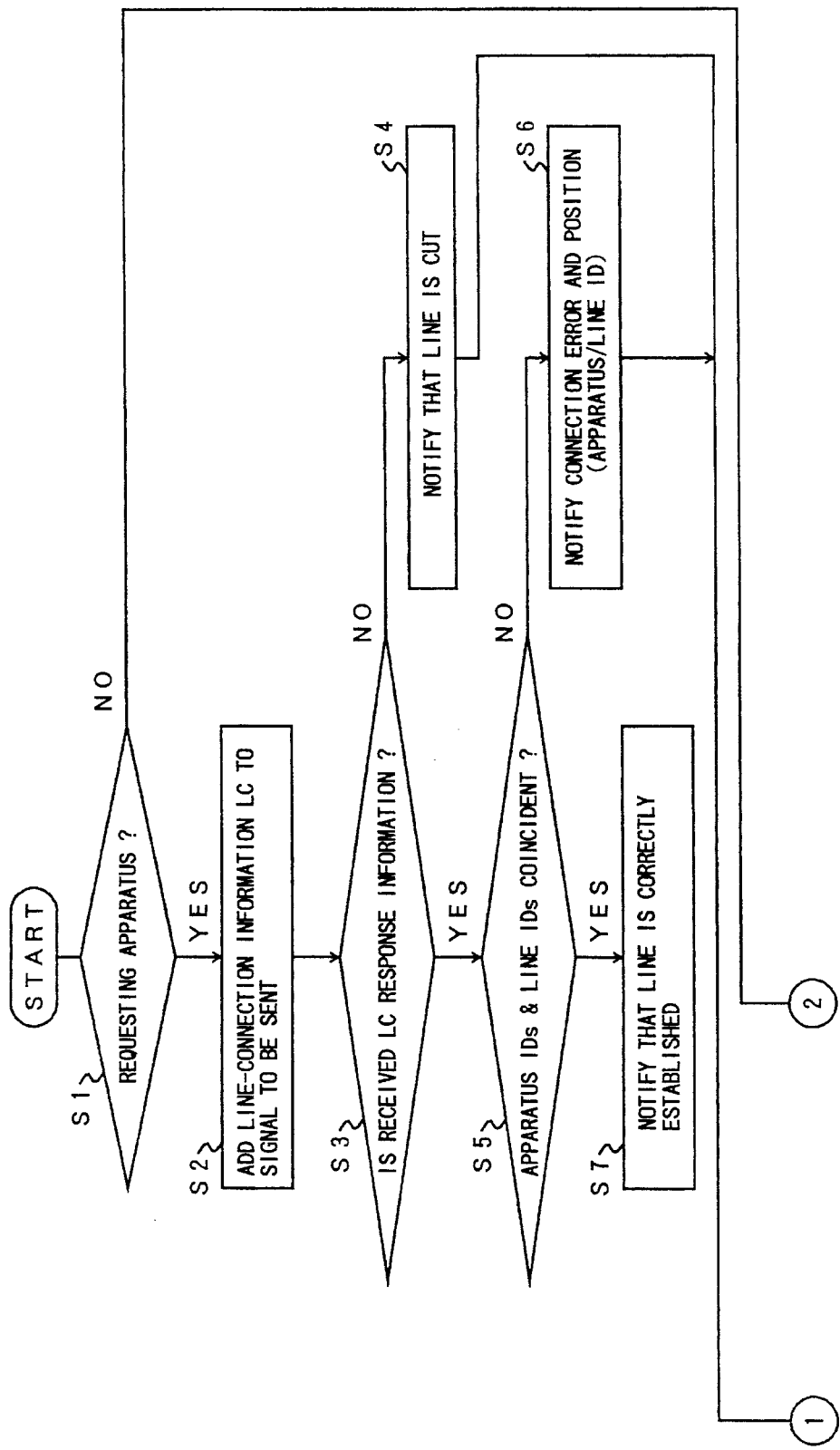

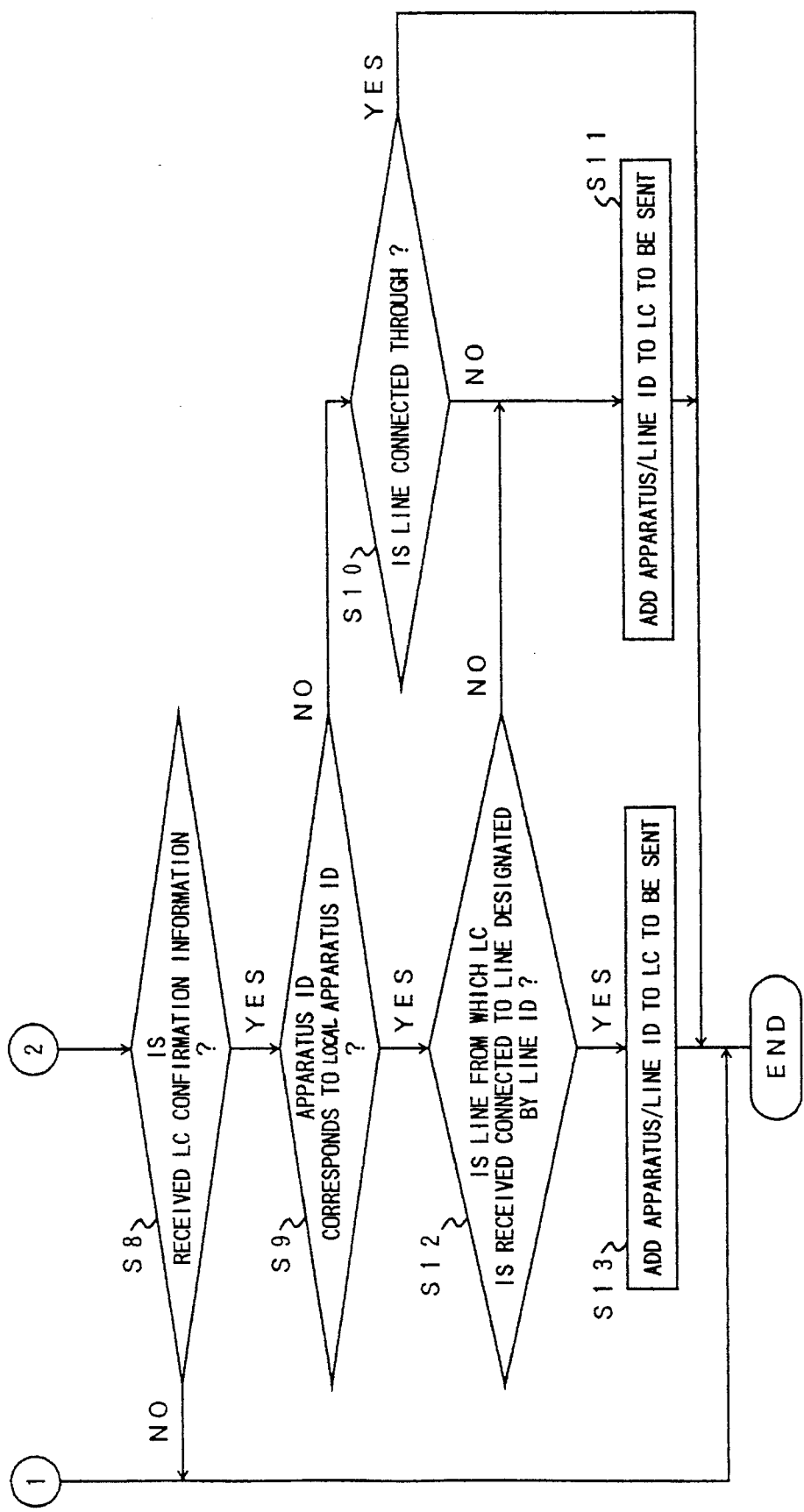

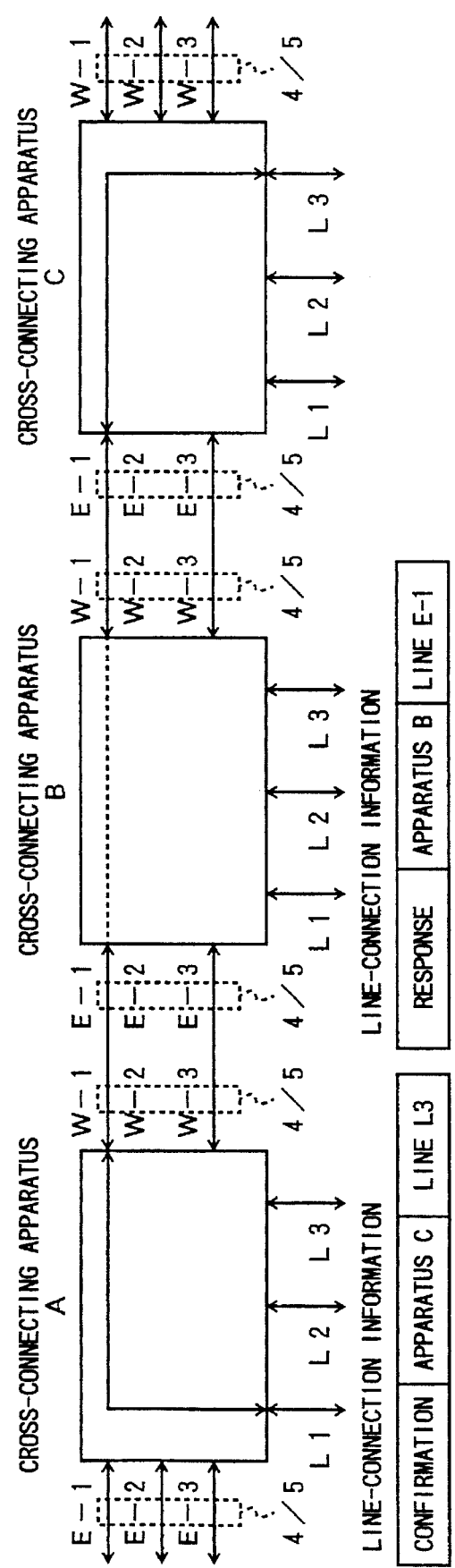

CROSS-CONNECTING SYSTEM FOR MAKING LINE CONNECTIONS BETWEEN HIGH-SPEED LINES AND LOW-SPEED LINES AND BETWEEN HIGH-SPEED LINES AND CAPABLE OF DETECTING A LINE-CONNECTION ERROR

BACKGROUND OF THE INVENTION

1) Field of the Invention

The present invention generally relates to a cross-connecting system, and more particularly to a cross-connecting system which connects a high-speed line and a low-speed line or two high-speed lines.

In recent years, in a communication field, flexibility and high efficiency have become a great concern for communication networks.

In order to achieve flexibility and high efficiency for communication networks, a conventional communication apparatus is provided with a cross-connecting function which can freely make a line connection between a high-speed line and a low-speed line or between two high-speed lines.

However, as a number of lines and a number of communication apparatuses provided in a network increase, an operation time for setting a line in each of the apparatuses increases. Accordingly, an installation time for the communication apparatus is increased due to a time spent on a detecting operation for a line-connection error.

In order to reduce the installation time, a function is required for the apparatus which can automatically detect a line-connection error.

2) Description of the Related Art

FIG. 1 is a block diagram of a conventional cross-connecting apparatus 11 and peripheral devices. The cross-connecting apparatus 11 is connected to a high-speed line 12 and a low-speed line 13. Between the high-speed line 12 and the cross-connecting apparatus 11, there are provided multiplexers (MUXs) 14 which multiplex a signal output from the cross-connecting apparatus 11 and demultiplexers (DMUXs) 15 which demultiplex a signal input from the high-speed line 12 and supplies the demultiplexed signal to the cross-connecting apparatus 11.

There are provided on a drop-side of the low-speed line 13 a path switch 16 and an identification (ID) information detecting unit 17. The path switch 16 switches a connection of the low-speed line 13 to either side of the high-speed line 12. Additionally, an identification (ID) information adding unit 18 is provided on an add-side of the low-speed line 13.

In the above-mentioned structure, identification (ID) information is added to signals on the low-speed line 13, and then the signals are sent to the multiplexer 14, via the cross-connecting apparatus 11. The identification information is arbitrarily set by an operator for checking whether or not a signal line routing from one cross connecting apparatus to a remote cross-connecting apparatus is correctly established. The identification information may be, for example, a character code by which a line can be identified.

The remote cross-connecting apparatus which received the identification information sends a main signal, input from the high-speed line 12 via the demultiplexer 15, to the low-speed line 13. The main signal is then sent to a desired line by means of the path switch 15, and the identification information included in the main signal is detected by the ID information detecting unit 17.

In the ID information detecting unit 17 of the remote cross-connecting apparatus, it is determined whether or not the identification information is included in an incoming main signal. When the identification information is detected by the remote cross-connecting apparatus, the detected identification information is compared with the identification information which must be detected by means of software. Then the operator checks a result of the comparison on a display. If the identification information is detected in an abnormal state, an operator must check a state of each connection in a network one by one so as to find a connection error.

As mentioned above, in the prior art, it is determined that the line connection is properly made only when identification information which has been sent by a cross-connection apparatus of a sending side is exactly detected by the ID information detecting unit of a receiving side. When the identification information is not detected or the received identification information is not proper identification information to be received, most of error seeking and correcting operations rely upon the judgment of the operator. Accordingly there is a problem in that a long time is spent on a set-up operation of lines, in particular, for a network having a complex construction.

Japanese Laid-Open Patent Applications No. 3-214949 and No. 5-1229 disclose a checking apparatus for checking a connection in a cross-connecting apparatus. In this checking apparatus, a main signal is input from an input of a cross-connecting apparatus so that the main signal is output from the cross-connecting apparatus. The checking apparatus checks a line connection within the cross-connecting apparatus by using an overhead provided in a frame of the main signal output from the cross-connection apparatus. This checking apparatus checks only a state of a line-connection from a view point of hardware. Accordingly, this checking apparatus is not capable of detecting a connection error in a network in which a plurality of cross-connecting apparatuses are provided, and thus an error seeking operation still relies upon a judgment made by an operator as previously mentioned.

SUMMARY OF THE INVENTION

It is a general object of the present invention to provide an improved and useful cross-connecting system in which the above-mentioned disadvantages are eliminated.

A more specific object of the present invention is to provide a cross-connecting system which is capable of automatically detecting a connection error and a position where the connection error has occurred.

In order to achieve the above-mentioned objects, there is provided according to the present invention, a cross-connecting system having a cross-connecting apparatus which makes connection between a high-speed line and a low-speed line or between two high-speed lines so as to transfer a main signal therethrough, the cross-connecting system comprising:

a line-connection information adding unit, provided on an output side of the high-speed line, for adding line-connection information to an overhead of the main signal;

a line-connection information detecting unit, provided on an input side of the high-speed line, for detecting the line-connection information added to the overhead of the main signal; and a determining unit which provides the line-connection information to the line-connection information adding unit, and determines a presence of a connection error along a line through which the main signal is transferred in accordance with the line-connection information received from a remote cross-connecting apparatus, wherein the line-connection information comprises type information, apparatus identification information and line identification information, the type information being set as either one of request information and response information, the request information representing that the line-connection information including the request information is sent from an originating cross-connecting system to a designated remote cross-connecting system, the response information representing that the line-connection information including the response information is sent back from the remote cross-connecting system to the originating cross-connecting apparatus which has sent the line-connection information having the request information, the apparatus identification information representing an apparatus identification of the cross-connecting apparatus provided in the designated remote cross-connecting system or a cross-connecting system in which an erroneous connection has been made, the line identification information representing a line identification of the low-speed line connected to the designated remote cross-connecting system or a line identification of the high-speed line of a cross-connecting system in which an erroneous connection has been made.

According to the present invention, all connection errors occurring along the designated line can be detected with their position information. Thus, a time spent on seeking and correcting operations for the connection error is reduced which leads to a reduction of time spent on establishing a network system.

Other objects, features and advantages of the present invention will become more apparent form the following detailed description when read in conjunction with the accompanying drawings.

BRIEF DESCRIPTION OF THE DRAWINGS

FIG. 4A is a part of a flow chart of a process performed by a determining unit shown in FIG. 2; FIG. 4B is a part of a flow chart of a process performed by a determining unit shown in FIG. 2;

FIG. 5 is an illustration of a part of a network in which a plurality of cross-connecting systems according to the present invention are provided in a case where a connection error has occurred in a cross-connecting apparatus between a requesting apparatus and an end apparatus;

DETAILED DESCRIPTION OF THE PREFERRED EMBODIMENT

Figure 2:
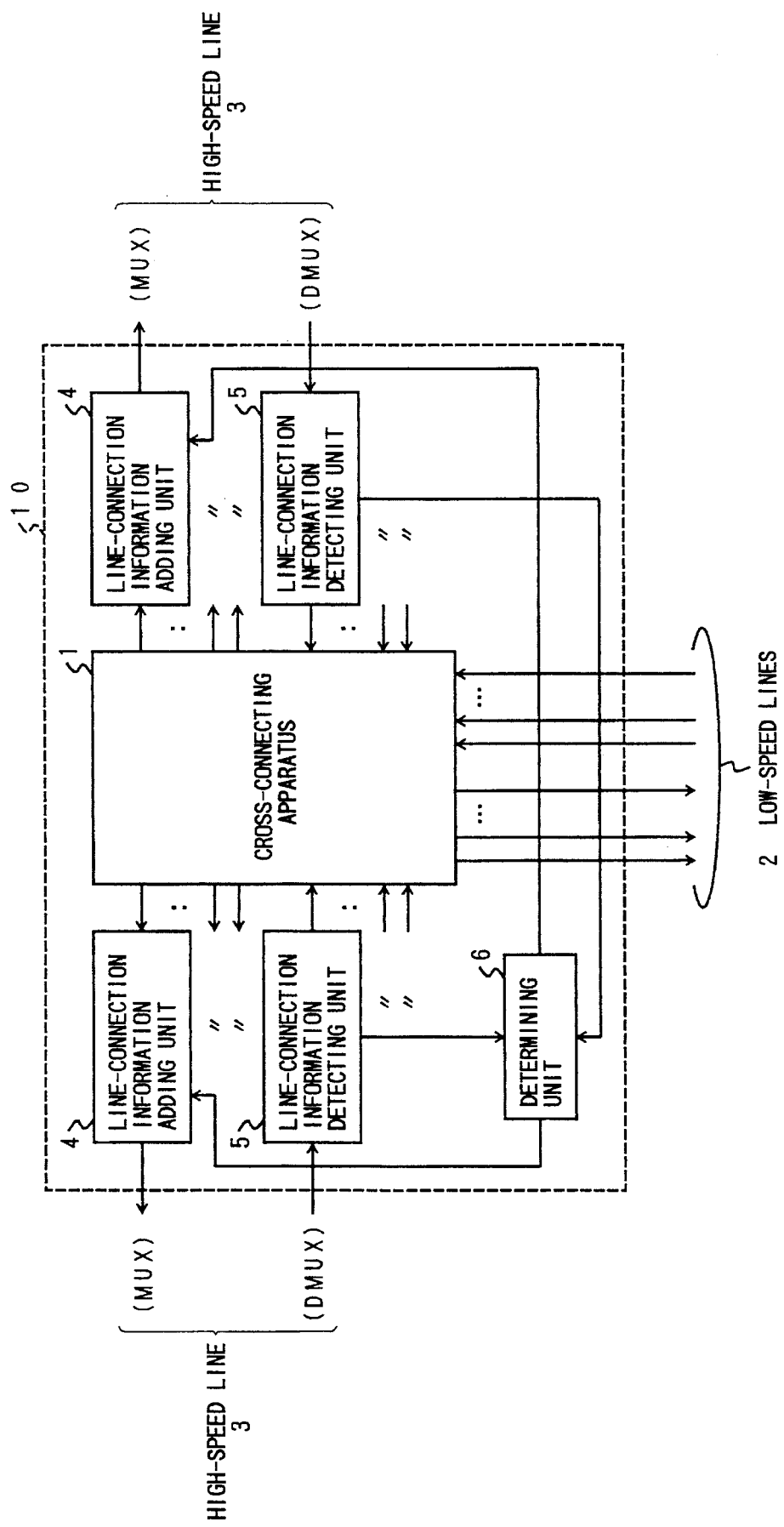
FIG. 2 is a block diagram of a structure of a cross-connecting system according to the present invention.

A description will now be given of an embodiment of a cross-connecting system according to the present invention. FIG. 2 shows a structure of a cross-connecting apparatus 1 according to the present invention.

Figure 1:
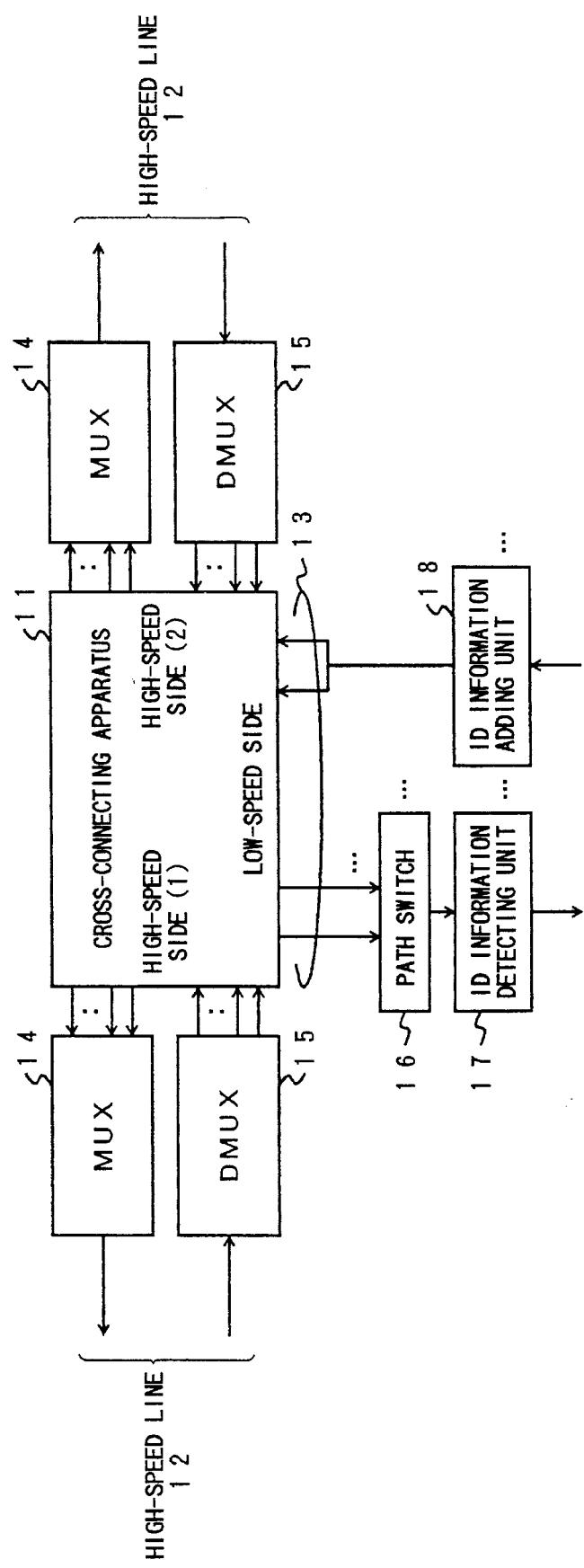
FIG. 1 is a block diagram of a conventional cross-connecting apparatus and peripheral devices.

The cross-connecting system 10 shown in FIG. 1 comprises a cross-connecting apparatus 1, line-connection information adding units 4, line-connection information detecting units 5 and a determining unit 6. The line-connection information adding units 4 are provided on output-sides of a high-speed line 3 so as to add line-connection information to an overhead of an outgoing main signal. The line-connection information detecting units 5 are provided on input-sides of a high-speed line 3 so as to detect the line-connection information in an overhead of an incoming main signal. The determining unit 6 supplies the line-connection information to the line-connection information adding units 4. Additionally, the determining unit 6 determines whether a connection error has occurred at a position along a signal line of the main signal in accordance with the line-connection information received from the line-connection information detecting units 5.

Figure 3:
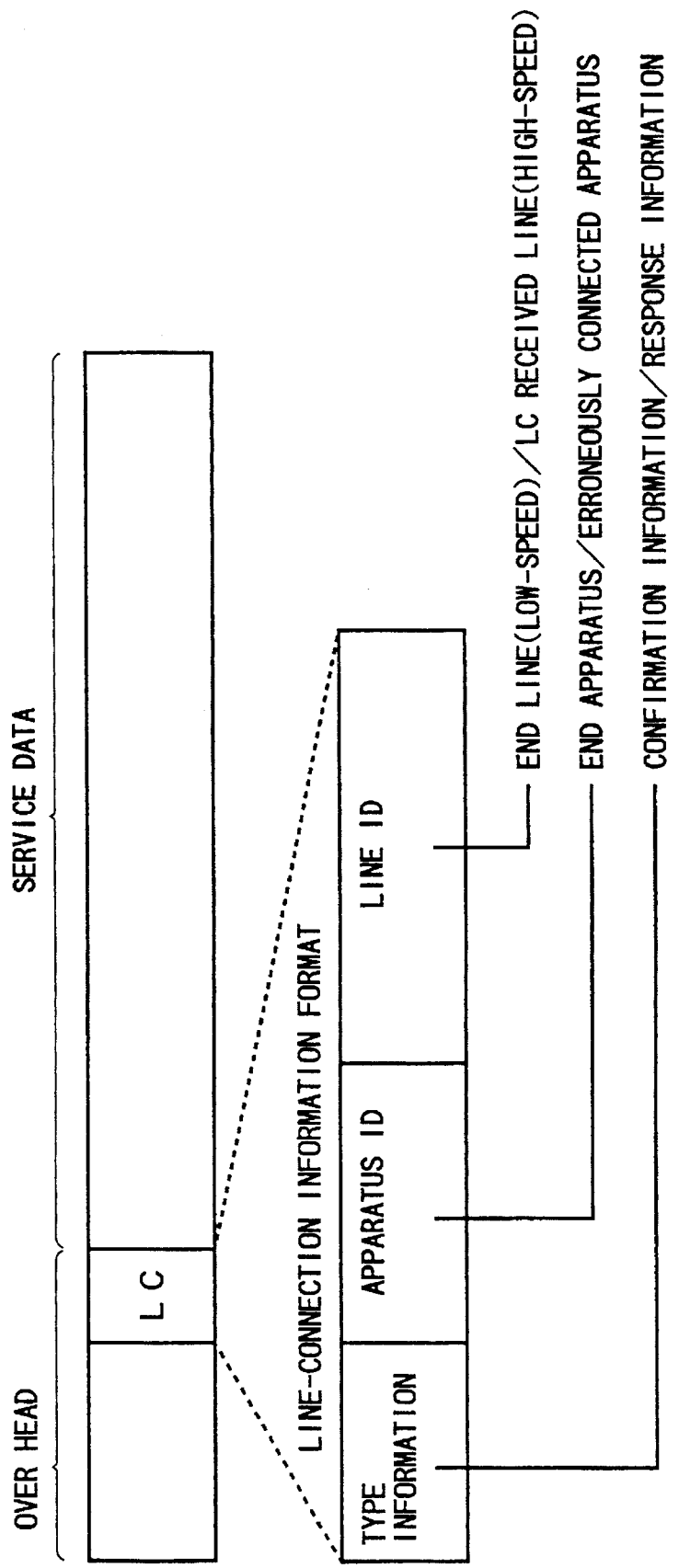
FIG. 3 is an illustration for explaining a frame of a main signal.

The line-connection information includes the following information as shown in FIG. 3.

a) type information (confirmation information and response information): This information is used for determining whether the line-connection information is related to a request for confirmation or a response to the request for confirmation.

b) identification information of a cross-connecting apparatus (apparatus ID): If the line-connection information is for the request for confirmation, this information represents the apparatus ID of the cross-connecting apparatus of an end of the signal line. If the line-connection information is for the response, and if the signal line is correctly established, this information represents the apparatus ID of a cross-connecting apparatus located at the end of the signal line. If the line-connection information is for the response, and if the signal line is established with an erroneous connection, this information represents the apparatus ID of the cross-connecting apparatus which has detected the error.

c) identification information of a line (line ID) : If the line-connection information is for the request for confirmation, this information represents the line ID of the line of an end of the signal line. If the line-connection information is for the response, and if the signal line is correctly established, this information represents the line ID of a low-speed line located at the end of the signal line. If the line-connection information is for the response, and if the signal line is established with an erroneous connection, this information represents the line ID of the high-speed line from which the line-connection information has been detected.

FIGS. 4A and 4B show a flow chart of a process performed by the determining unit 6. The steps 1 through 7 shown in FIG. 4A are performed by the determining unit 6 provided in the cross-connecting system 10 (referred to as requesting apparatus) which is requesting checking of an established line. The steps 8 through 13 shown in FIG. 4B are performed by the determining unit 6 provided in the cross-connecting system 10 (referred to as end apparatus) which is located at the end of the established line.

In step 1 (hereinafter step is abbreviated as "S"), the determining unit 6 determines whether or not the cross-connecting system 10, in which the determining unit 6 is provided, is set as the requesting apparatus. That is, the determining unit 6 determines whether or not the request for confirmation of desired connection is given by an operator. If the determining unit 6 determines that the local cross-connecting system 10 is set to be the requesting apparatus, the line-connection information LC (refer to FIG. 3) is added, in S2, to the overhead of the main signal output from the cross-connecting apparatus 1.

The cross-connecting system 10 set as the requesting apparatus wait for the line-connection information sent from a remote cross-connecting apparatus 1 which is set as the end apparatus. That is, the determining unit 6 in the requesting apparatus determines, in S3, whether or not the line-connection information in the overhead of an incoming main signal is the response information.

If the response information is not received for a predetermined period, the determining unit 6 determines that a line between the requesting apparatus and the end apparatus is cut somewhere, and thus notifies, in S4, to an operator, for example by using a display, the fact that the line is cut.

On the other hand, if the line-connection information is determined to be the response information by referring to the type information, it is determined, in S5, whether or not both of the apparatus IDs and the line IDs included in the line-connection information previously sent and that currently received are coincident.

If at least either the apparatus IDs or the line IDs are not coincident, a notification is given, in S6, to the operator of the fact that an erroneous connection has been made and a position where the erroneous connection has occurred.

A determination of the position where the erroneous connection has occurred can be made as follows. If the apparatus IDs are coincident, it indicates that a signal line from the requesting apparatus to the end apparatus is correctly established. Otherwise, the apparatus ID of the response information indicates an ID of a cross-connecting apparatus of the cross-connecting system which detected an erroneous connection. Additionally, if the apparatus IDs are coincident but the line IDs are not, the line ID of the response information indicates an ID of a high-speed line of the cross-connecting apparatus which received the line-connection information sent from the requesting apparatus.

If it is determined, in S5, that both the apparatus IDs and the line IDs are coincident, a notification is given, in S7, to the operator of the fact that a signal line has been correctly established. This is based on that coincidence of the apparatus IDs indicates that a signal line is correctly established through to the end apparatus and that coincidence of the line IDs indicates that the signal line is correctly established through to the low-speed line of the end apparatus.

On the other hand, if a determination of S1 is negative, the routine proceeds to S8 shown in FIG. 4B where the determining unit 6 determines whether or not the line-connection information LC detected by the line-connection information detecting unit 5 is the confirmation information.

If it is determined that the line-connection information of the received main signal is the confirmation information, it is determined, in S9, whether or not the apparatus ID designated by the requesting apparatus corresponds to the local apparatus ID. If the apparatus ID does not correspond to the local apparatus ID, it is determined, in S10, whether or not the high-speed line from which the line-connection information LC is received is connected through the local cross-connecting apparatus to a next cross-connecting apparatus. If it is determined that the high-speed line is connected through, the routine ends. Otherwise, the routine proceeds to S11 where the apparatus ID and the line ID of the high-speed line of the cross-connecting apparatus which received the line-connection informal LC are added to the line-connection information LC of a main signal to be sent as the response information.

On the other hand if it is determined, in S9, that the apparatus ID corresponds to the local apparatus ID, it is determined, in S12, whether or not the low-speed line designated by the line-connection information LC is connected to the high-speed line from which the line-connection information LC was received. If a result of a determination of S12 is negative, the routine proceeds to the above-mentioned S11. If the result of the determination of S12 is affirmative, the routine proceeds to S13 where the apparatus ID and the line ID of the low-speed line of the end apparatus which received the line-connection information LC are added to the line-connection information LC of a main signal to be sent as the response information.

In the above-mentioned manner, the cross-connecting system set as the requesting apparatus is capable of automatically detecting a connection error, and notifies it to the operator.

A description will now be given of an operation of the cross-connecting system according to the present invention in various conditions.

Figure 6:
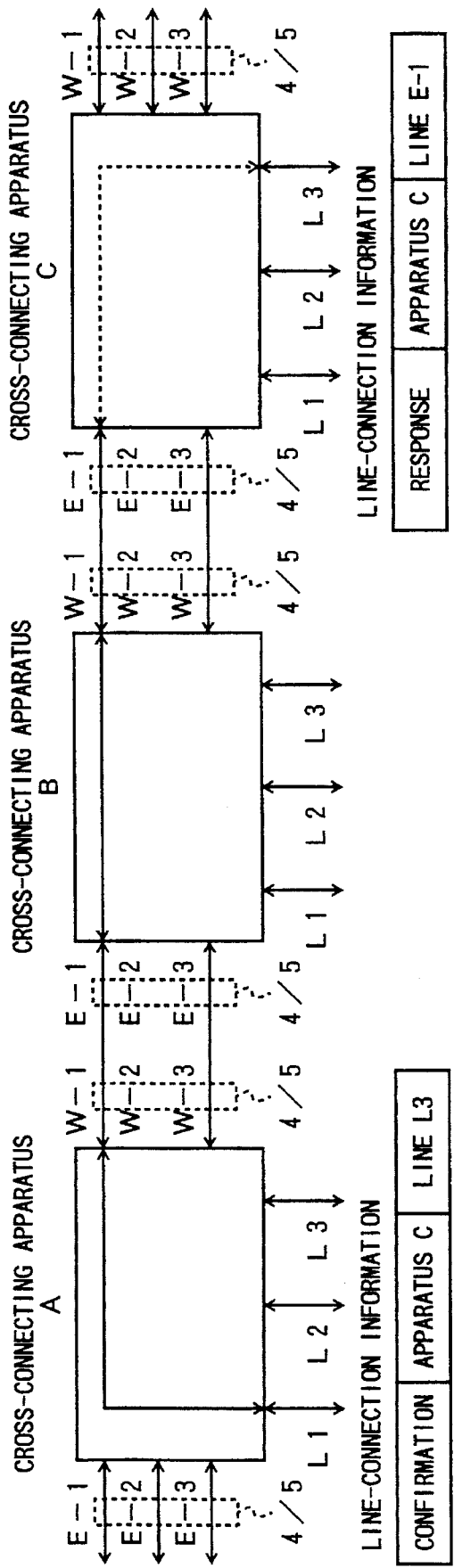
FIG. 6 is an illustration of a part of a network in which a plurality of cross-connecting systems according to the present invention are provided in a case where a connection error has occurred in an end apparatus.

FIGS. 5, 6 an 7 show a part of a network in which a plurality of cross-connecting systems 10 according to the present invention are provided. In these figures, each of cross-connecting apparatuses A, B and C corresponds the above-mentioned cross-connecting apparatus 1 provided in the cross-connecting system 10 in which the line-connection information adding unit 4 and the line-connection information detecting unit 5 are provided as shown in FIG. 2. The line-connection information adding unit 4 and the line-connection information detecting unit 5 are illustrated by dashed lines and illustration of the determining unit 6 is omitted for the sake of simplification. In these figures, the cross-connecting apparatus A corresponds to the requesting apparatus, and the cross-connecting apparatus C corresponds to the end apparatus.

A description will now be given, with reference to FIG. 5, of a case in which a connection error has occurred in a cross-connecting apparatus between the requesting apparatus and the end apparatus.

It should be noted that, in FIG. 5, a high-speed line W-1 and a high-speed line E-1 between adjacent two cross-connecting apparatuses refers to the same high-speed line.

In the cross-connecting apparatus A, the determining unit 6 sets the type information to be the confirmation information, the apparatus ID to be the ID of the cross connecting apparatus C and the line ID to be a low-speed line L3 connected to the cross-connecting apparatus C, so that the line-connection information adding unit 4 adds the line-connection information LC including the above information to the overhead of the frame of the main signal as shown in FIG. 3. The line-connection information LC is sent to a high-speed line W-1 connected to the cross-connecting apparatus A at the West side.

The cross-connecting apparatus B receives the line-connection information LC from a high-speed line E-1 which is connected to the cross-connecting apparatus B at the East side. However, since the apparatus ID indicates that the information is not addressed to the local apparatus (S8 and S9 of FIG. 4B), it is determined whether or not the high-speed line E-1 of the cross-connecting apparatus B is connected to the high-speed line W-1 of the cross-connecting apparatus B (S10).

In this case, it is assumed that connection between the high-speed lines E-1 and W-1 in the cross connecting apparatus B is cut (indicated by a dashed line in the figure). Accordingly, in order to notify the operator the connection error in the cross-connecting apparatus B, the cross-connecting system comprising the cross-connecting apparatus B sends the line-connection information LC by adding it to the over head of the main signal. The line-connection information LC being sent from the cross connecting system comprising the cross-connecting apparatus B includes the type information set to be the response information, the apparatus ID set to be the apparatus ID of the cross-connecting apparatus B and the line ID set to be the high-speed line E-1 from which the line-connection information was received. The line-connection information LC set in the cross-connecting apparatus B is sent to the cross-connecting apparatus A via the high-speed line E-1 (S11 of FIG. 4B).

The cross-connecting apparatus A receives the line-connection information, and thus recognizes the connection error in the cross-connecting apparatus B by the contents of the received line-connection information LC (S3, S5 and S6 of FIG. 4A).

A description will now be given, with reference to FIG. 6, of a case in which a connection error has occurred in the end apparatus.

In this case, the cross-connecting apparatus A sends the line-connection information in the same manner as mentioned in the above case, and the cross connecting apparatus B is properly connected, that is, the high-speed line E-1 of the cross-connecting apparatus B is connected through to the high-speed line W-1. Accordingly, it is determined that the high-speed line E-1 is connected through (S10) when the line-connection information is received by the cross-connecting system comprising the cross-connecting apparatus B, and when it is determined that the apparatus ID of the received line-connection information does not correspond to the local apparatus ID (S9). Thus, the received line-connection information LC is sent through to the high-speed line W-1 of the cross-connecting apparatus B.

The cross-connecting apparatus C receives the line-connection information LC from a high-speed line E-1. Since the apparatus ID indicates that the information is addressed to the local apparatus (S8 and S9 of FIG. 4B), it is determined whether or not the high-speed line E-1 from which the line-connection information was received is connected to the low-speed line L3 indicated by the line ID (S12).

In this case, it is assumed that connection between the high-speed lines E-1 and the low-speed line L3 in the cross connecting apparatus C is cut (indicated by a dashed line in the figure). Accordingly, in order to notify the operator the connection error in the cross-connecting apparatus C, the cross-connecting system comprising the cross-connecting apparatus C sends the line-connection information LC by adding it to the over head of the main signal. The line-connection information LC being sent from the cross-connecting apparatus C includes the type information set to be the response information, the apparatus ID set to be the apparatus ID of the cross-connecting apparatus C and the line ID set to be the high-speed line E-1 from which the line-connection information was received. The line-connection information LC set in the cross-connecting system comprising the cross-connecting apparatus C is sent to the cross-connecting apparatus A via the high-speed line E-1.

The cross-connecting apparatus A receives the line-connection information, and thus recognizes the connection error in the cross-connecting apparatus C by the contents of the received line-connection information LC.

Figure 7:
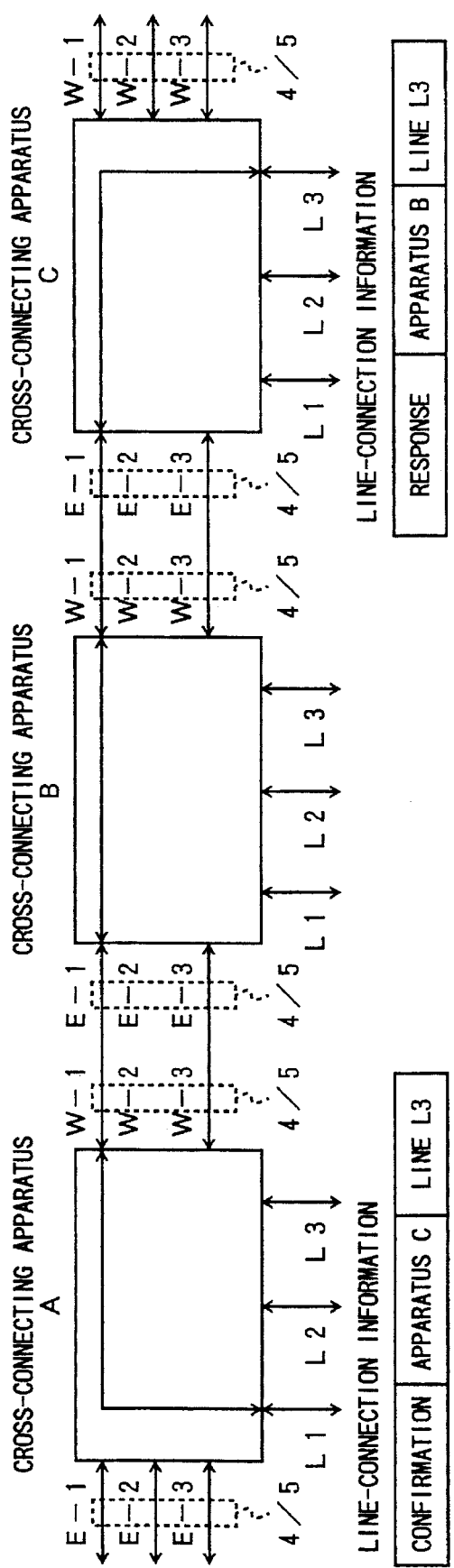
FIG. 7 is an illustration of a part of a network in which a plurality of cross-connecting systems according to the present invention are provided in a case where a signal line is correctly established from a requesting apparatus to a low-speed line of an end apparatus.

A description will now be given, with reference to FIG. 7, of a case in which a signal line is correctly established from the requesting apparatus to a low-speed line of the end apparatus.

Since the signal line is correctly connected, the line-connection information LC sent from the cross-connecting system comprising the cross-connecting apparatus A is received by the cross-connecting apparatus C as described in the above case.

Since the apparatus ID indicates that the information is addressed to the local apparatus, it is determined whether or not the high-speed line E-1 from which the line-connection information was received is connected to the low-speed line L3 indicated by the line ID (S12).

In this case, it is assumed that connection between the high-speed lines E-1 and the low-speed line L3 is correctly established in the cross-connecting apparatus C. Accordingly, in order to notify the operator that the signal line is correctly established, the cross-connecting system comprising the cross-connecting apparatus C sends the line-connection information LC by adding it to the over head of the main signal. The line-connection information LC being sent from the cross-connecting system comprising the cross-connecting apparatus C includes the type information set to be the response information, the apparatus ID set to be the apparatus ID of the cross-connecting apparatus C which is the end apparatus and the line ID set to be the low-speed line L3 which is the designated line. The line-connection information LC set in the cross-connecting system comprising the cross-connecting apparatus C is sent to the cross-connecting apparatus A via the high-speed line E-1 (S13).

The cross-connecting system comprising the cross-connecting apparatus A receives the line-connection information, and thus recognizes the signal line is correctly established in accordance with the contents of the received line-connection information LC (S5 and S7).

The present invention is not limited to the specifically disclosed embodiment, and variations and modification is may be made without departing from the scope of the present invention.

What is claimed is:

1. A cross-connecting system having a cross-connecting apparatus which makes connection between a plurality of high-speed lines and a plurality of low-speed lines so as to transfer a main signal therethrough, the cross-connecting system comprising:

a line-connection information adding unit, provided on an output side of each of said high-speed lines, for adding line-connection information to an overhead of the main signal;

a line-connection information detecting unit, provided on an input side of each of said high-speed lines, for detecting the line-connection information added to the overhead of the main signal; and a determining unit which provides the line-connection information to said line-connection information adding unit, and determines a presence of a connection error along a line through which the main signal is transferred in accordance with the line-connection information received from a remote cross-connecting apparatus, wherein the line-connection information comprises type information, apparatus identification information and line identification information, said type information being set as either one of request information and response information, said request information representing that the line-connection information including the request information is sent form an originating cross-connecting system to a designated remote cross-connecting system, said response information representing that the line-connection information including the response information is sent back from the remote cross-connecting system to the originating cross-connecting apparatus which sent the line-connection information having the request information, said apparatus identification information representing an apparatus identification of the cross-connecting apparatus provided in the designated remote cross-connecting system or in a cross-connecting system in which an erroneous connection has been made, said line identification information representing a line identification of one of said low-speed lines connected to said designated remote cross-connecting system or a line identification of one of said high-speed lines connected to a cross-connecting system in which an erroneous connection has been made.

2. The cross connecting system as claimed in claim 1, wherein said determining unit determines whether or not the line-connection is correctly made by comparing the apparatus identification information and the line identification information received from a remote cross-connecting system, respectively, with the apparatus identification information and the line identification information which have been sent from the local cross-connecting system to the designated remote cross-connecting system.

3. The cross-connecting system as claimed in claim 2, wherein said determining unit determines that the line-connection is correctly made when the apparatus identification information and the line identification information received from a remote cross-connecting system coincide respectively with the apparatus identification information and the line identification information which have been sent from the local cross-connecting system to the designated remote cross-connecting system.

4. The cross-connecting system as claimed in claim 3, wherein said determining unit determines, in accordance with the apparatus identification information and the line identification information received from the remote cross-connecting system, a position where an erroneous line-connection has been made when it is determined that the line-connection is not correctly made.

5. The cross-connecting system as claimed in claim 1, wherein said determining unit determines whether or not the local cross-connecting system is the designated remote cross-connecting apparatus by comparing the apparatus identification information detected by said line-connection information detecting unit with the apparatus identification information of the local cross-connecting system.

6. The cross-connecting system as claimed in claim 5, wherein said determining unit determines whether or not one of said high-speed lines from which the line-connection information is received, is connected through to a corresponding another one of said high-speed lines connected to the other side of the local cross-connecting system when the local cross-connecting system is determined to be neither the originating cross-connecting system nor the designated remote cross-connecting system.

7. The cross-connecting system as claimed in claim 6, wherein said determining unit provides the apparatus identification information of the local cross-connecting system and the line identification information of the line from which the line-connection information has keen received to said line-connection information adding unit so that said line-connection information unit adds the line-connection information to the main signal in accordance with information supplied by said determining unit.

8. The cross-connecting system as claimed in claim 5, wherein said determining unit determines whether or not one of said high-speed lines from which the line-connection information is received, is connected to one of said low-speed lines designated by the line identification information in the line-connection information detected by said line-connection information detecting unit when the local cross connecting system is determined to be the designated remote cross-connecting system in accordance with the line-connection information.

9. The cross-connecting system as claimed in claim 8, wherein said determining unit provides the apparatus identification information of the local cross-connecting system and the line identification information of said one of said high-speed lines, from which the line-connection information has been received, to said line-connection information adding unit so that said line-connection information adding unit adds the line-connection information to the main signal in accordance with information supplied by said determining unit when it is determined that said one of said high-speed lines from which the line-connection information is received, is not connected to said one of said low-speed lines designated by the line identification information in the line-connection information detected by said line-connection information detecting unit.

10. The cross-connecting system as claimed in claim 8, wherein said determining unit provides the apparatus identification information of the local cross-connecting system and the line identification information of said one of said low-speed lines which is connected to said one of said high-speed lines, from which the line-connection information has been received, to said line-connection information adding unit so that said line-connection information adding unit adds the line-connection information to the main signal in accordance with information supplied by said determining unit when it is determined that said one of said high-speed lines from which the line-connection information is received is correctly connected to said one of said low-speed lines designated by the line identification information in the line-connection information detected by said line-connection information detecting unit.

11. A cross-connecting system having a cross-connecting apparatus which makes connection between a plurality of first data-transmission lines and a plurality of second data-transmission lines so as to transfer a main signal therethrough, the cross-connecting system comprising:

a line-connection information adding unit, provided on an output side of each of said first data transmission lines, for adding line-connection information to an overhead of the main signal;

a line-connection information detecting unit, provided on an input side of each of said first data transmission lines, for detecting the line-connection information added to the overhead of the main signal; and a determining unit which provides the line-connection information to said line-connection information adding unit, and determines a presence of a connection error along a line through which the main signal is transferred in accordance with the line-connection information received from a remote cross-connecting apparatus, wherein the line-connection information comprises type information, apparatus identification information and line identification information, said type information being set as either one of request information and response information, said request information representing that the line-connection information including the request information is being sent from an originating cross-connecting system to a designated remote cross-connecting system, said response information representing that the line-connection information including the response information is being sent back from the remote cross-connecting system to the originating cross-connecting apparatus which had sent the line-connection information having the request information, said apparatus identification information representing an apparatus identification of the cross-connecting apparatus provided in the designated remote cross-connecting system or in a cross-connecting system in which an erroneous connection has been made, said line identification information representing a line identification of one of said second data-transmission lines connected to said designated remote cross-connecting system or a line identification of one of said first data-transmission lines connected to a cross-connecting system in which an erroneous connection has been made.

* * * * *